US011904911B2

(12) United States Patent
Glinka (10) Patent No.: US 11,904,911 B2
(45) Date of Patent: Feb. 20, 2024

(54) TRACK-GUIDED VEHICLE, ARRANGEMENT FOR COOLING AN ENERGY STORAGE DEVICE OF THE TRACK-GUIDED VEHICLE, AND METHOD FOR CONTROLLING THE ARRANGEMENT

(71) Applicant: SIEMENS MOBILITY GMBH, Munich (DE)

(72) Inventor: Martin Glinka, Uttenreuth (DE)

(73) Assignee: Siemens Mobility GmbH, Munich (DE)

( * ) Notice: Subject to any disclaimer, the term of this patent is extended or adjusted under 35 U.S.C. 154(b) by 694 days.

(21) Appl. No.: 16/956,013

(22) PCT Filed: Dec. 6, 2018

(86) PCT No.: PCT/EP2018/083724
§ 371 (c)(1),
(2) Date: Jun. 19, 2020

(87) PCT Pub. No.: WO2019/121029
PCT Pub. Date: Jun. 27, 2019

(65) Prior Publication Data
US 2020/0331504 A1 Oct. 22, 2020

(30) Foreign Application Priority Data

Dec. 19, 2017 (DE) ...................... 10 2017 223 214.5

(51) Int. Cl.
*H01M 10/613* (2014.01)
*H01M 10/625* (2014.01)
(Continued)

(52) U.S. Cl.
CPC ........... *B61C 3/02* (2013.01); *B60H 1/00278* (2013.01); *B60H 1/00328* (2013.01);
(Continued)

(58) Field of Classification Search
CPC ....... B61C 3/02; B61C 17/06; B60H 1/00278; B60H 1/00328; B60L 58/26;
(Continued)

(56) References Cited

U.S. PATENT DOCUMENTS

2007/0089442 A1 4/2007 Tsuchiya
2010/0128437 A1* 5/2010 Groppo .............. H05K 7/20927
361/689

(Continued)

FOREIGN PATENT DOCUMENTS

CN 103068602 A 4/2013
DE 112005000060 T5 9/2006
(Continued)

OTHER PUBLICATIONS

SIEMENS Ingenuity for Life: "Avenio Tram Education City, Doha, Qatar"—19 three-section, 100% low-floor trams, (Jan. 1, 2016), URL: https://assets.new.siemens.com/siemens/assets/public.1493113771. 1c4cad8e471b77c5302db82284f9ed324ce6cb58.avenio-qec-brochure-en.pdf, (Mar. 26, 2019), XP055574555.
(Continued)

*Primary Examiner* — Muhammad S Siddiquee
(74) *Attorney, Agent, or Firm* — Laurence A. Greenberg; Werner H. Stemer; Ralph E. Locher (57) ABSTRACT

A rail-bound vehicle includes an energy storage device having a traction battery and a cooling device for cooling the traction battery using a coolant circulating in at least one coolant circuit. The energy storage device supplies a traction device of the vehicle with electrical energy. At least one air-conditioning device air conditions a passenger compartment of a car of the vehicle using a refrigerant circulating in a refrigerant circuit, and a control device controls the air-conditioning device. The air-conditioning device has a heat exchanger coupling the refrigerant circuit of the air-
(Continued)

conditioning device to the coolant circuit of the cooling device of the energy storage device. The control device controls a flow of the refrigerant through the heat exchanger. An energy storage device, an air-conditioning device, an arrangement for cooling a traction battery and a method for controlling the arrangement are also provided.

12 Claims, 4 Drawing Sheets

(51) Int. Cl.
*B61C 3/02* (2006.01)
*B61C 17/06* (2006.01)
*B61D 27/00* (2006.01)
*B60L 58/26* (2019.01)
*B60H 1/00* (2006.01)
*H01M 10/6568* (2014.01)

(52) U.S. Cl.
CPC .............. *B60L 58/26* (2019.02); *B61C 17/06* (2013.01); *B61D 27/0018* (2013.01); *H01M 10/613* (2015.04); *H01M 10/625* (2015.04); *H01M 10/6568* (2015.04); *H01M 2220/20* (2013.01)

(58) Field of Classification Search
CPC ............ B61D 27/0018; H01M 10/613; H01M 10/625; H01M 10/6568; H01M 2220/20; Y02E 60/10; Y02T 10/70; Y02T 30/00
See application file for complete search history.

(56) References Cited

U.S. PATENT DOCUMENTS

| 2011/0139397 | A1 | 6/2011 | Haussmann |
| 2013/0118707 | A1 | 5/2013 | Kardos et al. |
| 2014/0331693 | A1 | 11/2014 | Meitinger et al. |
| 2016/0159204 | A1 | 6/2016 | Katoh et al. |
| 2017/0267056 | A1* | 9/2017 | Kim .................... B60H 1/3205 |

FOREIGN PATENT DOCUMENTS

| DE | 102009043316 A1 | 3/2011 |
| DE | 102009050921 A1 | 4/2011 |
| DE | 102010039028 A1 | 2/2012 |
| DE | 102011107540 A1 | 1/2013 |
| DE | 102016211341 A1 | 12/2017 |
| FR | 2940634 A1 | 7/2010 |
| FR | 3041288 A1 | 3/2017 |
| JP | 2015123922 A | 7/2015 |
| KR | 20120091771 A | 8/2012 |

OTHER PUBLICATIONS

SIEMENS: "Sitras HES"—Hybrid energy storage system form rail vehicles, (Jan. 1, 2014), URL: https://www.siemens.com/press/pool/de/feature/2012/infrastructure-cities/rail-systems/2012-08-avenio/produktinformation-sitras-hes-d.pdf, (Mar. 26, 2019), XP055574561.

* cited by examiner

TRACK-GUIDED VEHICLE, ARRANGEMENT FOR COOLING AN ENERGY STORAGE DEVICE OF THE TRACK-GUIDED VEHICLE, AND METHOD FOR CONTROLLING THE ARRANGEMENT

BACKGROUND OF THE INVENTION

Field of the Invention

The present invention relates to a rail-bound vehicle, an arrangement for cooling an energy storage device of the rail-bound vehicle and a method for controlling the arrangement.

Electrically driven rail-bound vehicles, in particular track vehicles, that are supplied with electrical energy via an overhead line, a third rail or the like rely on the route to be traveled being fully equipped with an energy supply of this kind. However, in the recent past there has been an increasing demand for such vehicles also to be used on routes that that are not fully equipped in this way. In order also to enable the propulsion of vehicles in sections of a route without a corresponding energy supply infrastructure, the vehicles are equipped with energy stores, for example in the form of capacitors or batteries.

One example of such a vehicle is the streetcar designated Avenio® made by the company Siemens AG, which was equipped with a hybrid energy storage system for track vehicles, known by the designation Sitras® HES, also made by Siemens AG, for the Education City project in Doha, Qatar, (see: https://www.mobility.siemens.com/mobility/global/SiteCollectionDocuments/de/rail-solutions/trams-and-light-rail/avenio_qatar_en.pdf;

https://www.siemens.com/press/pool/de/feature/2012/infrastructure-cities/rail-systems/2012-08-avenio/produktinformation-sitras-hes-d.pdf). Said energy storage system consists of a combination of double-layer capacitors and a traction battery, which store electrical energy that is both generated during braking procedures of the vehicle and supplied when stationary at streetcar stops.

A traction battery of this kind has a plurality of electrically interconnected battery cells or modules of battery cells having a high capacity and energy density. To ensure a long service life of the battery cells, they should be operated within a defined temperature range, wherein the temperature range is defined in dependence on the materials used for the battery cells. Herein, in particular in the case of high ambient temperatures, it is necessary to cool the battery cells in order to keep their temperature at a value within the temperature range. Battery cells themselves also generate heat, for example during charging and discharging processes, that has to be dissipated appropriately. To this end, the traction battery of the aforementioned hybrid energy storage system Sitras® HES is equipped with a water-cooling system, which, together with the air-conditioning system required therefor, is integrated in the container in which the traction battery is arranged.

However, the integration of an air-conditioning system in the container of the traction battery disadvantageously results in high costs and increased space requirement. It is therefore an object of the present invention to disclose a more favorable arrangement for cooling a traction battery, in particular with respect to costs and space requirement.

SUMMARY OF THE INVENTION

This object is achieved by the rail-bound vehicle, the arrangement, the energy storage device, the air-conditioning device, the arrangement and the method as claimed in the independent claims. Developments are disclosed in the respective dependent claims.

According to a first aspect of the invention, a rail-bound vehicle has at least one energy storage device with at least one traction battery and a cooling device for cooling the traction battery by means of a coolant circulating in at least one coolant circuit, wherein the energy storage device serves to supply at least one traction device of the vehicle with electrical energy. Furthermore, the vehicle has at least one air-conditioning device for air-conditioning a passenger compartment of a car of the vehicle by means of a refrigerant circulating in a coolant circuit and a control device for controlling the air-conditioning device. Characteristically, the air-conditioning device of the vehicle additionally has a heat exchanger, which couples the refrigerant circuit of the air-conditioning device to the coolant circuit of the cooling device of the energy storage device and the control device is designed to control a flow of the refrigerant through the heat exchanger.

The provision according to the invention of an additional heat exchanger in the air-conditioning device via which the coolant circuit of the energy storage device is coupled to the refrigerant circuit of the air-conditioning device enables an air-conditioning device that exclusively serves to cool the traction battery to be dispensed with. This can advantageously enable costs and the space required for the traction battery to be reduced.

According to a development of the first aspect of the invention, the control device is further designed to control the flow of the coolant in the coolant circuit. This advantageously enables the control device to be used to control the flow of both the refrigerant and the coolant in the refrigerant or coolant circuits.

According to a further development of the first aspect of the invention, the air-conditioning device has at least one valve arranged upstream of the heat exchanger in the refrigerant circuit and the control device is further designed to control the flow of the refrigerant through the heat exchanger by means of the valve. The valve controlled by the control device is preferably arranged upstream of the heat exchanger thus enabling the valve to regulate the flow of the refrigerant through the heat exchanger. Alternatively, the valve can similarly be arranged downstream of the heat exchanger, wherein in this case, however, the pressure of the coolant in the heat exchanger may disadvantageously be increased.

According to a further development of the first aspect of the invention, the heat exchanger is arranged in the refrigerant circuit parallel to an evaporator of the air-conditioning device. In the evaporator of a so-called cold vapor air-conditioning system, such as are used in a known manner in rail-bound vehicles, liquid refrigerant is evaporated and thus cools through-flowing air which is fed to the passenger compartment. The arrangement of the additional heat exchanger, which is, for example, implemented in the form of a water/water-heat exchanger, parallel to the evaporator also enables liquid refrigerant to be fed to the heat exchanger thus enabling a highly efficient exchange of heat or cold energy between the refrigerant and the similarly liquid coolant.

According to a further development of the first aspect of the invention, the traction battery has a plurality of battery cells or a plurality of modules with a respective plurality of battery cells. The use of battery cells advantageously enables simple and flexible dimensioning with respect to the desired voltage and capacitance of the traction battery.

According to a further development of the first aspect of the invention, the energy storage device also serves to supply auxiliaries of the vehicle with electrical energy. These auxiliaries can in particular also include the air-conditioning devices used in the vehicle which also require electrical energy for their operation. Herein, the auxiliaries are, for example, supplied via one or more so-called auxiliary converters for different voltage and frequency ranges, which are connected to the DC link of a traction current converter or directly to the energy storage device.

According to a second aspect of the invention, an energy storage device for a rail-bound vehicle has at least one traction battery for supplying at least one traction device of the vehicle with electrical energy and a cooling device for cooling the traction battery by means of a coolant circulating in at least one coolant circuit. Characteristically, the coolant circuit is connected via at least one heat exchanger arranged in at least one air-conditioning device to a refrigerant circuit of the air-conditioning device, wherein the air-conditioning device serves to air-condition a passenger compartment of a car of the vehicle by means of a refrigerant circulating in the refrigerant circuit.

According to a development of the second aspect of the invention, the circulation of the coolant in the coolant circuit and the circulation of the refrigerant in the refrigerant circuit is controlled by a control device for controlling the air-conditioning device.

According to a third aspect of the invention, an air-conditioning device for a rail-bound vehicle has at least one refrigerant circuit in which a refrigerant circulates for air-conditioning a passenger compartment of a car of the rail-bound vehicle. Characteristically, an additional heat exchanger by means of which a coolant circuit of a cooling device of an energy storage device of the vehicle is coupled to the refrigerant circuit is arranged in the refrigerant circuit.

According to a development of the third aspect of the invention, at least one valve by means of which a control device for controlling the air-conditioning device controls a flow of the refrigerant through the heat exchanger is arranged upstream of the additional heat exchanger in the refrigerant circuit of the air-conditioning device.

According to a further development of the third aspect of the invention, the heat exchanger is arranged parallel to an evaporator in the refrigerant circuit of the air-conditioning device.

According to a fourth aspect of the invention, an arrangement for cooling a traction battery of a rail-bound vehicle has at least one energy storage device according to the second aspect, at least one air-conditioning device according to the third aspect and a control device for controlling the air-conditioning device and the energy storage device.

A fifth aspect of the invention relates to a method for controlling an arrangement for cooling a traction battery of an energy storage device of a rail-bound vehicle, wherein the energy storage device serves as part of the arrangement for supplying at least one traction device of the vehicle with electrical energy and furthermore has a cooling device for cooling the traction battery by means of a coolant circulating in at least one coolant circuit and wherein the arrangement has at least one air-conditioning device for air-conditioning a passenger compartment of a car of the vehicle by means of a refrigerant circulating in a refrigerant circuit and a control device. Characteristically, the control device controls a flow of the refrigerant through a heat exchanger additionally arranged in the refrigerant circuit, wherein the heat exchanger couples the refrigerant circuit to the coolant circuit.

According to a development of the fifth aspect of the invention, at least the following steps are carried out in the control device: detecting a current or expected future temperature of the traction battery, comparing the detected temperature of the traction battery with a target temperature or a target temperature range, ascertaining the required cooling capacity for cooling the traction battery in dependence on a temperature difference determined, controlling the flow of the refrigerant in the refrigerant circuit of the air-conditioning device and the coolant of the coolant circuit of the cooling device through the heat exchanger in dependence on the ascertained required cooling capacity.

Herein, the current temperature of the battery cells of the traction battery can, for example, be detected by means of temperature sensors arranged on battery cells or in the vicinity thereof, for example on a housing of a module. Alternatively, temperature sensors can also determine a temperature of the coolant or a difference between the respective temperature of the coolant flowing into the cooling device and out of the cooling device and infer a current temperature of the battery cells or the traction battery from this difference. An expected increase in the temperature of the battery cells can be determined from a known behavior of the battery cells during a charging process, i.e. heating of the battery cells caused by the charging process or the flow of a charging current so that the cooling of the traction battery can be actuated even before leaving the target temperature or the target temperature range. This can in particular be used advantageously in the case of known scheduling of the control of the charging process. If, for example, the traction battery is charged at all or certain stops on a route of the vehicle by a charging infrastructure arranged at said stops, it is possible, for example, for the cooling circuit of the traction battery to be activated as soon as the vehicle arrives at such a stop. This is in particular advantageous if the traction battery is already charged during the braking process preceding the stop by means of electrical energy generated by an electrodynamic brake.

According to a further development of the fifth aspect of the invention based on the above development, the control device controls the flow of the refrigerant through an evaporator of the air-conditioning device for cooling the passenger compartment in dependence on the ascertained required cooling capacity for the traction battery.

The following describes the invention in more detail with reference to exemplary embodiments.

DETAILED DESCRIPTION OF THE INVENTION

For reasons of clarity, the same reference characters are used in the figures for identical or identically acting, or virtually identically acting, components.

Figure 1:
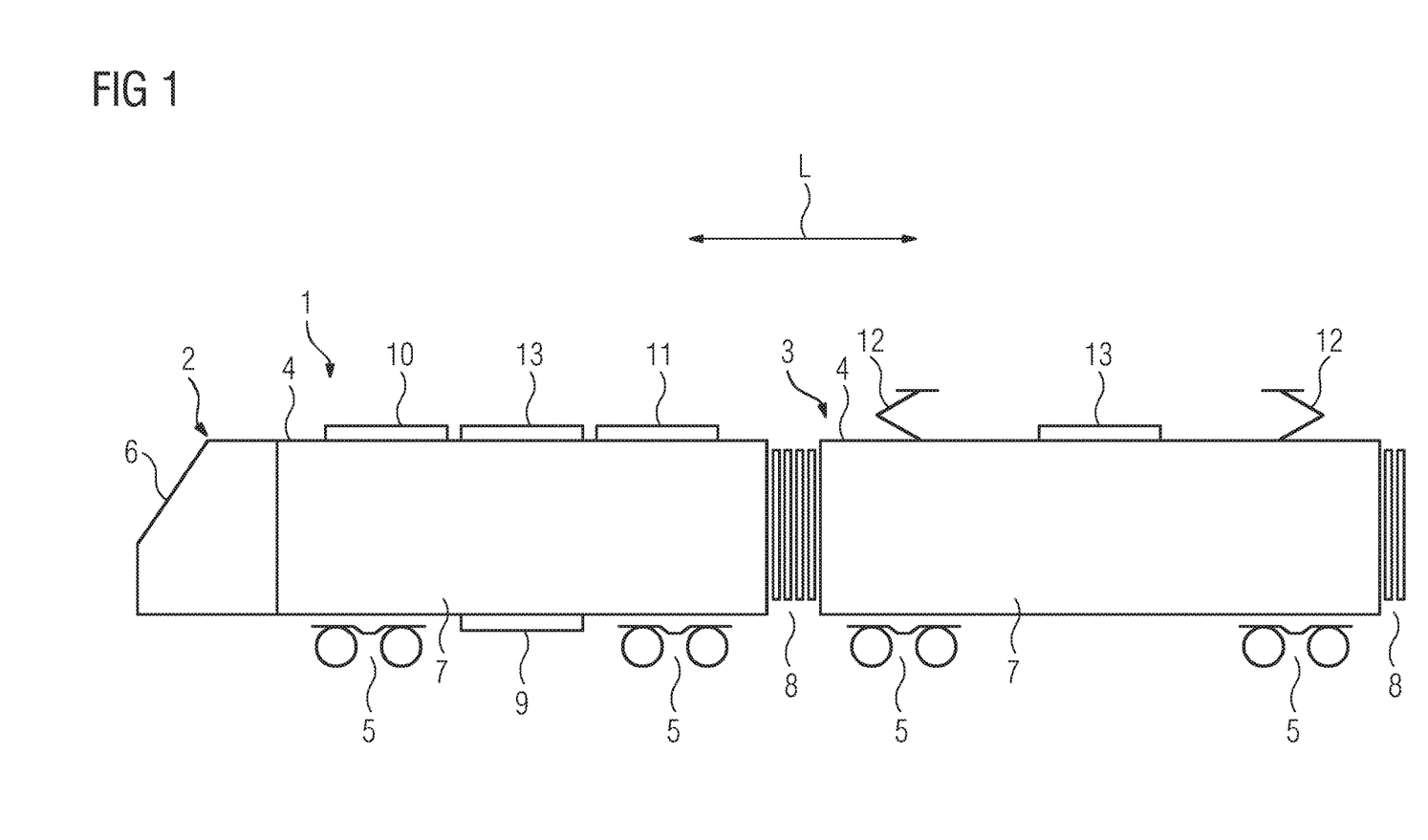
FIG. 1 a schematic side view of a rail-bound vehicle.

FIG. 1 is a schematic side view of an exemplary rail-bound vehicle 1, in particular a track vehicle. The track vehicle 1 is, for example, embodied as a multiple-unit train for passenger transit with a plurality of cars, wherein this figure only depicts a first car in the form of an end car 2 and a second car coupled to the first car in the form of an intermediate car 3 to which further cars can be connected. The two cars depicted each have a car body 4 supported by bogies 5 in the form of motor or trailer bogies on tracks that are not depicted, wherein the rear, right-hand end of the end car 2 and the front, left-hand end of the intermediate car 3 can also be supported on a common bogie, in particular on a so-called Jacobs bogie. The end car 2 is by way of example divided into a plurality of spatial regions with respect to the longitudinal axis L or horizontal axis. These regions are, on the one hand, a driver's cab or head module 6 in the front region, and, on the other, a car body 4 adjoining the driver's cab 6. The car body 4 encloses a passenger compartment 7 in which seating for passengers is provided. In contrast to the end car 2, the intermediate car 3 coupled to the end car 2 only has a car body 4 that also encloses a passenger compartment 7. Passengers can enter and exit the passenger compartments 7 of the cars 2, 3 via doors (not shown) arranged in side walls of the respective car body 4. Furthermore, passengers can access the passenger compartment 7 of the adjacent car 2, 3 via an inter-car gangway 8. Such inter-car gangways 8 are usually protected from environmental influences by concertina walls or folding walls.

By way of example, a plurality of electrical units or containers for such units or the housing thereof are arranged on the roof and under the base or in the underfloor region of the car body 4 of the end car 2 as part of the electrical equipment of the multiple-unit train 1. These serve, for example, to drive the multiple-unit train 1, in particular to supply and control traction motors that are not depicted in FIG. 1. The traction motors are, for example, arranged in the right-hand bogie 5 of the end car 2, which is embodied as a driving bogie; further bogies of the multiple-unit train 1 can also be equipped with traction motors, in particular in dependence on the propulsion power required. A transformer 9 the primary winding of which can be connected via pantographs 12 is arranged by way of example on the roof of the car body 4 of the intermediate car 3 to an overhead line carrying a high-voltage alternating current (not depicted) can, for example, be arranged in the underfloor region of the car body 4. On the other hand, by way of example a traction current converter 10 connected to the transformer 9 to supply the traction motors with electrical energy is arranged on the left-hand side of the roof of the car body 4 of the end car 2. By way of example, an energy storage device 11 with a traction battery, which is, for example, connected to a DC link of the traction current converter 10, is arranged on the right-hand side of the roof of the car body 4 of the end car 2. By way of example, in each case an air-conditioning system 13 that serves to air-condition the underlying passenger compartment 7 is arranged centrally on the roofs of the car bodies 4 of the depicted cars 2, 3.

In addition to the components of the electrical equipment of the multiple-unit train depicted by way of example, further components, in particular control devices, further auxiliaries and equipment for supplying them with power can be arranged in a similar manner on the roof, in the underfloor region or even in the interior of the car bodies. The depicted arrangement of special components, in particular the traction battery 11, on the roof and in the underfloor region of the car bodies is also exemplary only. The transformer 9 can, for example, also be arranged on the roof or in the interior of the car body, while, for example, the air-conditioning system 14 can in each case be arranged in the underfloor region of the car body. The same applies to further parts of the electrical equipment of the multiple-unit train.

Figure 2:
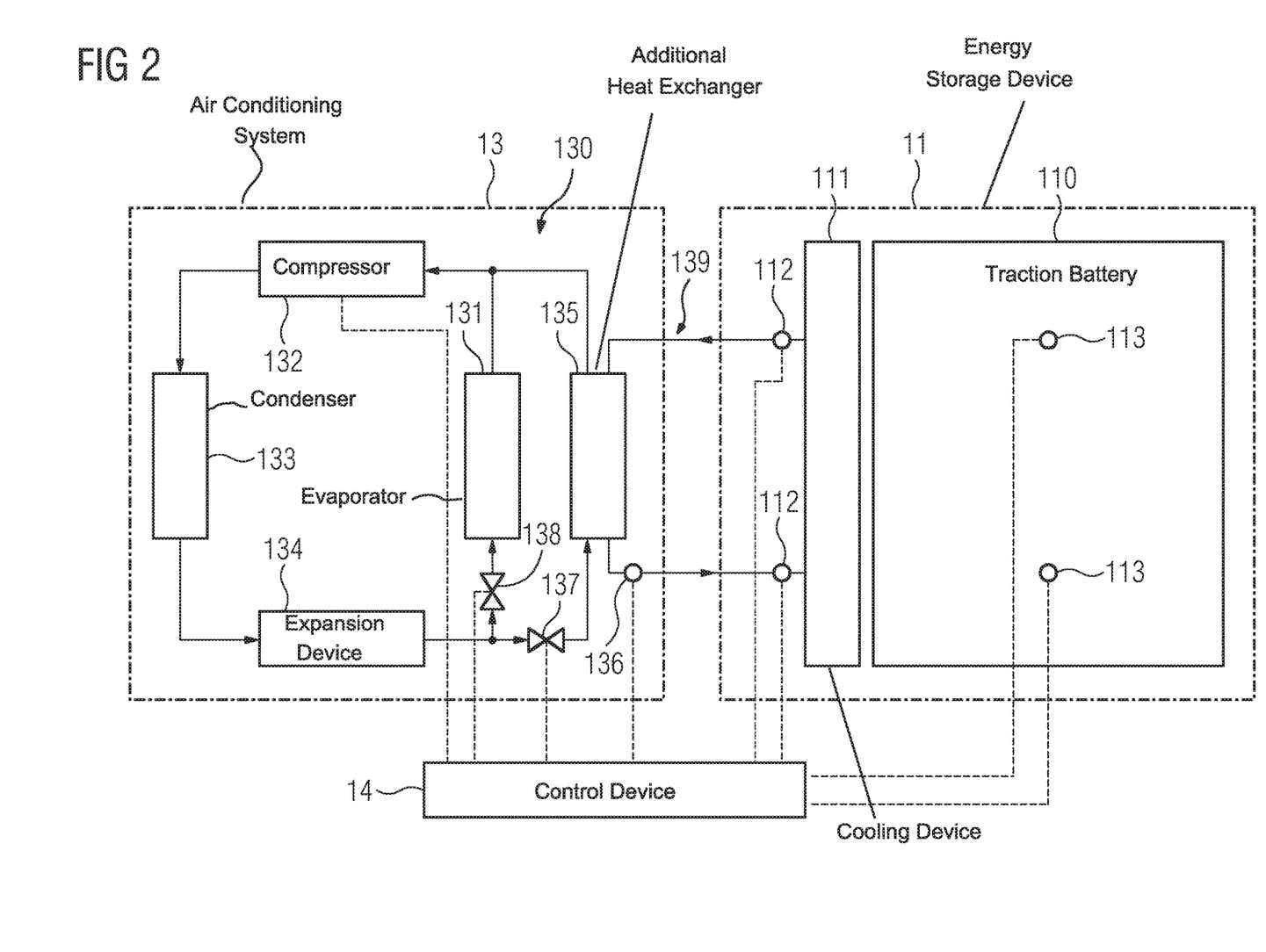
FIG. 2 a schematic depiction of an arrangement according to the invention with an air-conditioning device and an energy storage device, FIG. 3 a schematic depiction of an alternative arrangement according to the invention and FIG. 4 a flow chart of a method according to the invention.

FIG. 2 is a schematic depiction of an in each case exemplary configuration of the air-conditioning system 13 and traction battery 11 components arranged next to one another on the roof of the end car 2 in FIG. 1, which in the figure are in each case demarcated by a dash-dotted line. In the event of no air-conditioning system being arranged in the end car 2, in particular if this does not have a passenger compartment, the two components air-conditioning system 13 and energy storage device 11 with traction battery 110 can also be arranged on different, for example adjacent, cars.

The configuration of the air-conditioning system 13 depicted by way of example basically corresponds to the configuration of a so-called cold-vapor air-conditioning system such as is already used in cars of multiple-unit trains. This has a refrigerant circuit 130 with substantially four components of which the respective functions are explained briefly below. The individual components are interconnected in a known manner by lines, tubes or hoses for transporting the refrigerant in liquid and gaseous state. The components of the air-conditioning are usually arranged in a common housing which is not depicted for reasons of clarity.

A cold-vapor air-conditioning system operates according to the principle of a compression refrigeration system according to which a circulating refrigerant is compressed in gaseous form, condensed as a result of heat dissipation and evaporated again by pressure reduction with heat absorption. With the four essential components of the air-conditioning system depicted, this means that warm air from the passenger compartment and possibly additionally fresh air supplied from outside the passenger compartment flows through an evaporator 131 with the aid of a blower (not depicted). In the evaporator 131, which in principle has the function of an air/water heat exchanger, the liquid refrigerant that has, for example, cooled down to 8° C. evaporates and thus cools the through-flowing air. The air cooled in this way is divided by fresh-air ducts and air outlets that are usually arranged in the interior ceiling region of the car at suitable points of the interior ceiling in the passenger compartment of the car. A compressor 132 arranged downstream of the evaporator 131 in the direction of flow of the refrigerant draws in the refrigerant vapor generated and increases its pressure from 3.8 bar at the outlet of the compressor 131 to 17 bar. At the same time, the compression causes the temperature of the refrigerant vapor to increase from 13° C. to 100° C., for example. A condenser 133 arranged downstream of the compressor 132 in the direction of flow of the refrigerant, which has the function of an air/water-heat exchanger, uses outside air to cool the refrigerant vapor down to 60° C., for example, so that this condenses again. Finally, an expansion device 134, for example an expansion valve, arranged downstream of the condenser 133 in the direction of flow of the refrigerant reduces the pressure of the refrigerant to the exemplary 3.8 bar cited so that it cools down to the above-cited temperature of 8° C. Finally, the cooled liquid refrigerant flows back into the evaporator 131 thus completing the refrigerant circuit.

Figure 3:
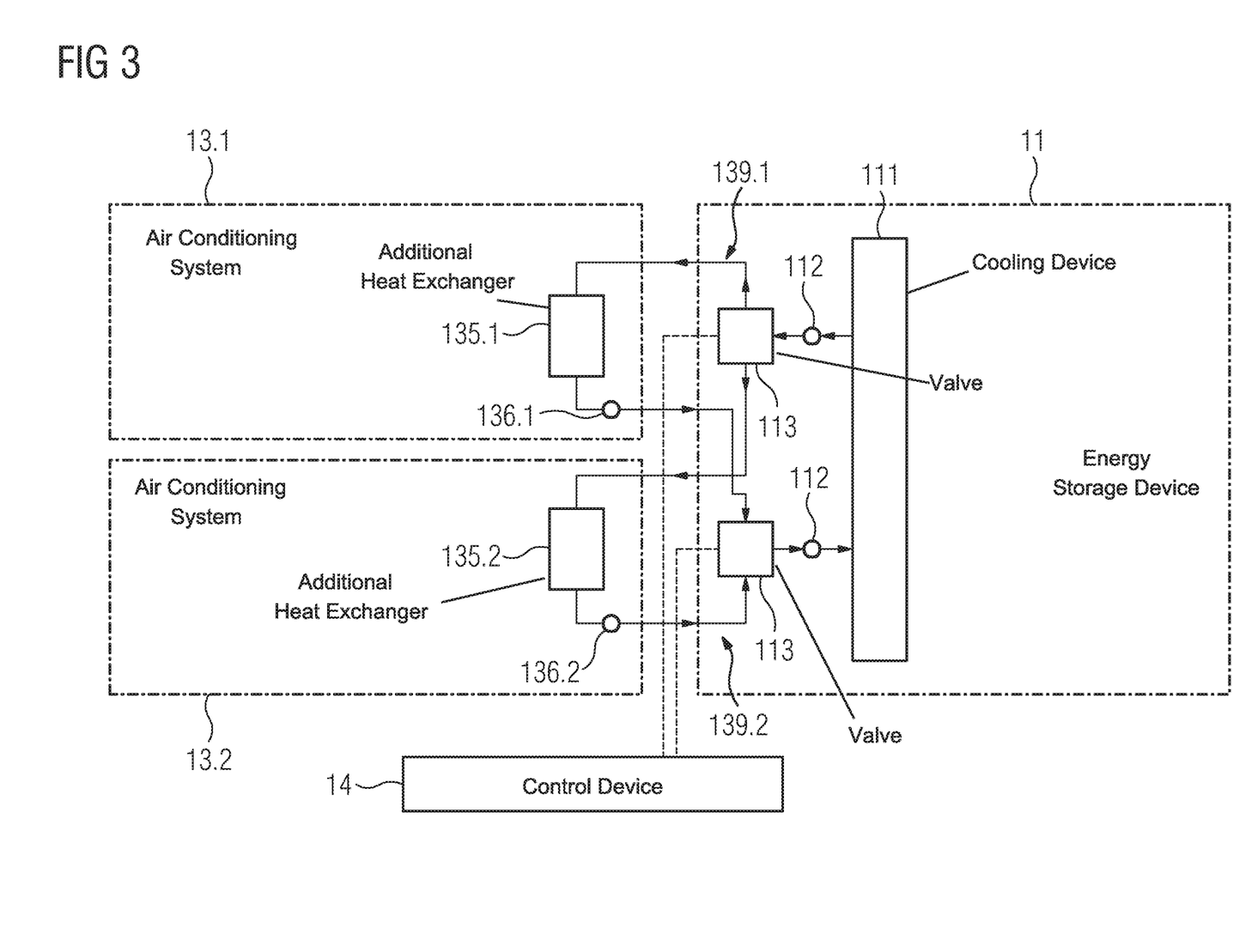

The above-described air-conditioning system 13 together with the named components can preferably also be embodied as redundant for each car of the multiple-unit train, as is depicted schematically in FIG. 3 by way of example. This means that maximum cooling capacity can only be provided by both air-conditioning systems, hence each of the air-conditioning systems is only able to provide a part of the maximum cooling capacity. As a result, this can advantageously ensure at least partial cooling of the associated passenger compartment in the event of a failure of one of the two air-conditioning systems. On the other hand, when the required cooling capacity for the passenger compartment can be satisfied by one of the two air-conditioning systems, the other air-conditioning system can be switched off, thus advantageously increasing the efficiency of the system and simultaneously reducing costs. The provision of at least a part of the cooling capacity is in particular important for multiple-unit trains in the high-speed range in order to ensure the well-being of passengers in particular in the case of high ambient temperatures. In such multiple-unit trains, fresh air is usually exclusively supplied via the air-conditioning system of a car wherein it is not possible to open the car's windows as a possible alternative method of supplying fresh air.

The energy storage device 11 depicted in FIG. 2 by way of example has at least one traction battery 110 consisting of one or more modules with a respective plurality of electrically interconnected battery cells. The battery or individual cell modules are usually arranged in a common housing that ensures that the battery cells are protected against environmental influences. Once again, such a housing is not depicted separately in FIG. 2 for reasons of clarity.

Due to the requirements for the operating temperature of the battery cells in order to ensure a high energy density and service life described in the introduction, the traction battery 110 is connected to a cooling device 111. This can, for example, be implemented in the form of heat sinks connected to the individual battery cells or the housing of a cell module through which a liquid coolant circulates. By way of example, in FIG. 2 the cooling device 111 is only depicted to the side of the traction battery 110, however, in practice, the cooling device 111 or the heat sinks thereof should preferably substantially completely cover the floor space occupied by the traction battery 110 or the battery cells thereof in order to ensure uniform cooling or heating of the battery cells. The coolant is heated or cooled in dependence on the ambient temperature or the current condition of the battery cells in order to keep the temperature of the battery cells within the preferred operating temperature range. Preferably, temperature sensors 112 with which the inlet and outlet temperatures of the coolant can be determined are arranged in each case in the region in which the coolant enters the cooling device 111 and in the region in which the coolant exits the cooling device 111. These determined temperatures are, for example, used to determine an average temperature of the battery cells of the traction battery 110 and to derive from this any requirement for a reduced or increased supply of coolant or the temperature thereof. In addition, it is also possible for further temperature sensors 113, as depicted supplementarily in FIG. 2 by way of example, to be provided in the housing of the traction battery 110 and/or in or on housings of individual cell modules in order to enable a more accurate determination of the respective temperature of the battery cells or cell modules.

In the known hybrid energy storage system for track vehicles, Sitras® HES made by the company Siemens AG, described in the introduction, an air-conditioning system that serves to cool the coolant for the battery cells is integrated in the housing of the traction battery. In contrast, the energy storage device 11 according to the invention does not have a separate air-conditioning system integrated in a housing together with the traction battery. Instead, the described air-conditioning system 13 for air-conditioning the passenger compartment 7 of a car, or the refrigerant circuit 130 thereof, is supplemented by an additional water/water-heat exchanger 135.

Herein, the additional heat exchanger 135 is arranged parallel to the evaporator 131 in the described refrigerant circuit 130 so that the liquid refrigerant that has cooled down to 8° C., for example, during the operation of the compressor 132, can flow through both the evaporator 131 and the heat exchanger 135. A liquid pump 136, for example a circulating pump, transports the coolant for cooling the traction battery 110 through the heat exchanger 135 where it is cooled by the passing flow of refrigerant, while the refrigerant is heated by the passing flow of coolant and changes into the gaseous state. The transportation of the coolant between the cooling device 111 of the traction battery 110 and the heat exchanger 135 of the air-conditioning system 13 takes place by means of suitable tubes, lines or hoses. When arranged outside the car body, these should preferably be supplementarily thermally insulated with a suitable material in order to minimize the emission of refrigerating or heating energy into the environment. In particular in the exemplary configuration of the multiple-unit train 1 in FIG. 1, in which both the air-conditioning system 13 and the energy storage device 11 are arranged on the roof of the car body 4, arrangement outside the car body is probable.

In the example in FIG. 2, a heat exchanger 135 that operates in accordance with the countercurrent principle with which refrigerant and coolant flow past one another in opposite directions as depicted by the respective direction of flow of the refrigerant and coolant indicated by means of arrows. However, it is also possible for other known types of heat exchanger to be used in the same manner. In a similar manner, the liquid pump 136 arranged in the region of the air-conditioning system 13 in the example in FIG. 2 can also be arranged in the region of the energy storage device 11, in particular in the cooling device 111.

The function of the air-conditioning system 13 for the passenger compartment 7 of the end car 2 is controlled by a control device 14 which is, for example, also arranged in the end car 2. Said control device can, for example, only control the air-conditioning system 13 of the end car 2, however, alternatively, it can also be embodied to control the air-conditioning systems of all the cars of the multiple-unit train 1 as a central control device. Moreover, the control device 14 can also be part of a higher-ranking central control device, in particular for the control of auxiliaries of the multiple-unit train 1. The control device 14 actuates, for example in dependence on a comparison of current actual temperature with a setpoint or specified target temperature of the passenger compartment 7, the compressor 132 of the air-conditioning system 13. Herein, the actuation takes place, for example, by means of an electrical control line, as shown by way of example in FIG. 2 in the form of a dashed line going from the control device 14 to the compressor 132. When the compressor 132 has been switched on, its operation causes the refrigerant to circulate in the refrigerant circuit 130, while switching the compressor 132 off by the control device 14 interrupts the circulation of the refrigerant. For the function of the compressor 131 and condenser 133 with a circulating refrigerant, the control device 14 further controls the ventilators or blowers associated with these components in order to guide air through the corresponding air/water-heat exchanger. The ventilators or blowers are also actuated by the control device 14 by means of electrical control lines, wherein, however, like the ventilators or blowers, these control lines are also not depicted separately in FIG. 2.

By way of example, two one-way valves 137, 138 by means of which the flow of the refrigerant to the evaporator 131 and the heat exchanger 135 can be controlled are arranged in the refrigerant circuit 130 expanded by the additional heat exchanger 135. Alternatively to the arrangement depicted, these valves 137, 138 can also in each case be arranged downstream of the evaporator 131 and the heat exchanger 135 in the direction of flow of the refrigerant. Furthermore, the two valves 137, 138 can be replaced by a three-way valve that enables a flow of the refrigerant to the evaporator 131 only, to the heat exchanger 135 only or to both the evaporator 131 and to the heat exchanger 135. It is however, in particular if there is always a requirement to cool the passenger compartment 7, also possible only to provide the valve 137 that controls the flow of the refrigerant to the heat exchanger 135 when there is also a requirement to cool the traction battery 11. The valves 137, 138 or the alternatively possible three-way valve is again controlled by the control device 14 by means of electrical control lines.

The different switching states of the valves 137, 138 controlled by the control device 14 depend upon the respective cooling required by the passenger compartment 7 of the car and the traction battery 110. For example, when travelling on an electrified section of a route during which the multiple-unit train 1 is, for example, supplied with electrical energy via for example an overhead line and the traction battery 110 is neither charged nor discharged, as a rule the traction battery 11 does not need to be cooled. In such a situation, the control device 14 closes the valve 137 arranged upstream of the heat exchanger 135 so that the air-conditioning system 13 serves in a known manner exclusively to cool the passenger compartment 7 as required. If there is also no requirement to cool the passenger compartment in such a situation, for example because the temperature of the passenger compartment 7 is within the range of or below the target temperature, the control device 14 can also switch off the operation of the compressor 132 and thus terminate the refrigerant flow in the refrigerant circuit 130.

On the other hand, when the multiple-unit train 1 is operated on a non-electrified section of a route where electrical energy for propelling the multiple-unit train 1 is taken from the traction battery 110, the discharging process can result in the battery cells being heated to above a prespecified temperature threshold necessitating cooling of the traction battery. Such heating of the battery cells can, for example, also occur during a charging process of the traction battery 11 or if the ambient temperature is close to the temperature threshold. The heating of battery cells or cell modules can, for example, be detected by the temperature sensors 113 disclosed in FIG. 2 or during the operation of the coolant pump 136 from the difference between the temperatures of the coolant measured by the temperature sensors 112. Alternatively, however, if the behavior of battery cells is known, the temperature of the battery cells or the cell modules can be inferred on the basis of a measurement of the charging or discharging current. In such cases, the control device 14 opens the valve 137 so that refrigerant flows through the heat exchanger 135 when the compressor 132 is in operation. Further, the control device 14 controls the liquid pump 136 in accordance with the cooling capacity required by the traction battery 110 so that coolant cooled in the heat exchanger 135 circulates through the coolant circuit 139 of the cooling device 111 and cools the battery cells or cell modules of the traction battery 110. Depending upon whether cooling of the passenger compartment 7 is also required during the period of cooling of the traction battery 110, the control device 1 closes or opens the valve 138 arranged upstream of the evaporator 131 and controls the function of the ventilator or blower of the compressor 131 accordingly.

The components compressor 132, condenser 133, expansion device 134 and possibly the tubes, lines or hoses connecting these components as well as further components of the air-conditioning system 13 that are not described above must be adapted to the increased requirement for cooling capacity caused by the additional cooling of the traction battery 11 compared to the known exclusive use for cooling the passenger compartment 7 of a car. In principle, for this, the components of the air-conditioning system are dimensioned in accordance with the total maximum cooling capacity required for the passenger compartment 7 and the traction battery 110. However, the comparatively high thermal time constant of the passenger compartment, this means that the temperature of the passenger compartment only changes comparatively slowly, can advantageously be used to reduce the cooling capacity for the passenger compartment to in particular zero, for example during the period of a charging process of the traction battery 110 or a limited part of this period, so that a higher cooling capacity is available for the traction battery. Hence, taking into account such a control option, the maximum cooling capacity of the air-conditioning system 13 can be selected lower than the total maximum required cooling capacity for the passenger compartment 7 and traction battery 110 and the cited components dimensioned accordingly.

In the case of the redundant embodiment of the air-conditioning system 13 as described above, the supply of cooling capacity to the energy storage device 11 can be more flexible. A redundant configuration of this kind is depicted schematically in FIG. 3, wherein individual components or constituents of the air-conditioning system 13 and the energy storage device 11 described above were not depicted. In this case, the air-conditioning consists of two separately constructed air-conditioning systems 13.1 and 13.2, which are in each case constructed in accordance with the air-conditioning system 13 depicted in FIG. 2 and in each case can provide a part of the maximum cooling capacity. The two air-conditioning systems 13.1, 13.2 can be arranged in separate housings or containers, however alternatively also in a common housing or container, for example once again on the roof of the car body. The additional heat exchangers 135.1, 135.2 for cooling the traction battery integrated in the air-conditioning systems 13.1, 13.2 are in each case connected to the cooling device 111 in the energy storage device 11 via suitable tubes, lines or hoses for transporting the coolant. In the cooling device 111 of the energy storage device 11, a separate coolant circuit 139.1, 139.2 can be provided for each air-conditioning system 13.1, 13.2, however the coolant circuits can alternatively also be combined in the cooling device or, viewed in the direction of flow of the coolant, combined in front of the cooling device 111 and separated again after this, as depicted by way of example in FIG. 3.

When the coolant circuits 139.1, 139.2 are combined, preferably valves should be arranged in all coolant inflow points and outflow points of the cooling device 111. For this, a one-way valve corresponding to the one-way valves 137, 138 described with respect to FIG. 2, which can also be controlled by the control device 14 via control lines, can, for example, be provided in each inflow point and outflow point. Alternatively, however, it is also possible to use three-way valves 113, as arranged in the energy storage device 11 by way of example in FIG. 3. Alternatively, the one-way valves or three-way valves 113 can also be arranged in the air-conditioning systems 13.1, 13.2 or in only one of the two air-conditioning systems 13.1, 13.2, wherein in the latter case tubes, lines or hoses of at least one coolant circuit 139.1, 139.2 would have to be guided between the two air-conditioning systems 13.1, 13.2.

Suitable actuation of the valves 113 and the coolant pumps 136.1, 136.2 via electrical control lines enables the control device 14 to control the coolant flow through the cooling device 111 of the energy storage device 11 as required. For example, if only a moderate cooling capacity is required, it is possible, for example, for only one of the two coolant circuits to be activated. If, for example, this is the lower coolant circuit 139.2 supplied by the lower air-conditioning system 13.2 via the heat exchanger 135.2, the control device 14 actuates the coolant pump 136.2 and the three-way valves 113 such that coolant can circulate in the lower coolant circuit 139.2 through the heat exchanger 135.2 and the cooling device 111, while no coolant circulates in the upper coolant circuit 139.1 supplied by the upper air-conditioning system 13.1 via the heat exchanger 135.1. In particular, if also only a moderate cooling capacity is required for the passenger compartment, the sole operation of the lower air-conditioning system 13.2 may be sufficient to cool both the passenger compartment 7 and the traction battery 11.

On the other hand, if a high cooling capacity is required for both the passenger compartment and the traction battery, such as may be the case, for example, during a charging process of the traction battery accompanied by a high ambient temperature, both air-conditioning systems 13.1, 13.2 are operated in order to cover the required cooling capacity. In this case, the control device 14 actuates the coolant pumps 136.1, 136.2 of both the lower and the upper coolant circuit 139.1 and the three-way valves 113 such that coolant from both coolant circuits 139.1, 139.2 circulates through the cooling device 111 of the energy storage device 11. Moreover, the actuation of the respective compressor and the respective one-way valves of the two air-conditioning systems 13.1, 13.2 as described above with respect to FIG. 2 enables the control device 14 to regulate the flow of refrigerant through the evaporator and heat exchanger 135.1, 135.2 such that sufficient cooling capacity for the traction battery is provided. As mentioned above, in the case of a high requirement for cooling capacity for the traction battery 110, the cooling capacity for the passenger compartment can be reduced temporarily, for example during all or part of the period of the charging process of the traction battery 110, in favor of the cooling capacity for the traction battery since the temperature of the passenger compartment only increases comparatively slowly. After the completion of the charging process or after a reduction of the cooling capacity required for the traction battery, a corresponding actuation of the valves in the two air-conditioning systems 13.1, 13.2 enables increased cooling capacity to be provided again for the passenger compartment so that the actual temperature of the passenger compartment, which after this period may possibly be outside a target temperature range, can again approximate the target value.

In this situation, the actuation of the air-conditioning systems 13.1, 13.2 and the valves 113 in the traction battery 11 by the control device 14 can in particular take place such that the cooling capacity required for the traction battery 11 is exclusively or at least predominantly covered by one of the two air-conditioning systems 13.1, 13.2 while the cooling capacity required for the passenger compartment is exclusively or at least predominantly covered by the other one of the two air-conditioning systems 13.1, 13.2. However, alternatively, both air-conditioning systems 13.1, 13.2 can provide cooling capacity for both the traction battery 11 and the passenger compartment in the same way.

The actuation of the described components of the air-conditioning systems 13.1, 13.2 and the energy storage device 11 is performed with the aim of maximizing operational efficiency. In particular, full-load operation or almost full-load operation of one of the air-conditioning systems is more efficient than a respective partial-load operation of both air-conditioning systems. At the same time, low wear and a long service life of the individual components should be taken into account on the actuation.

Figure 4:
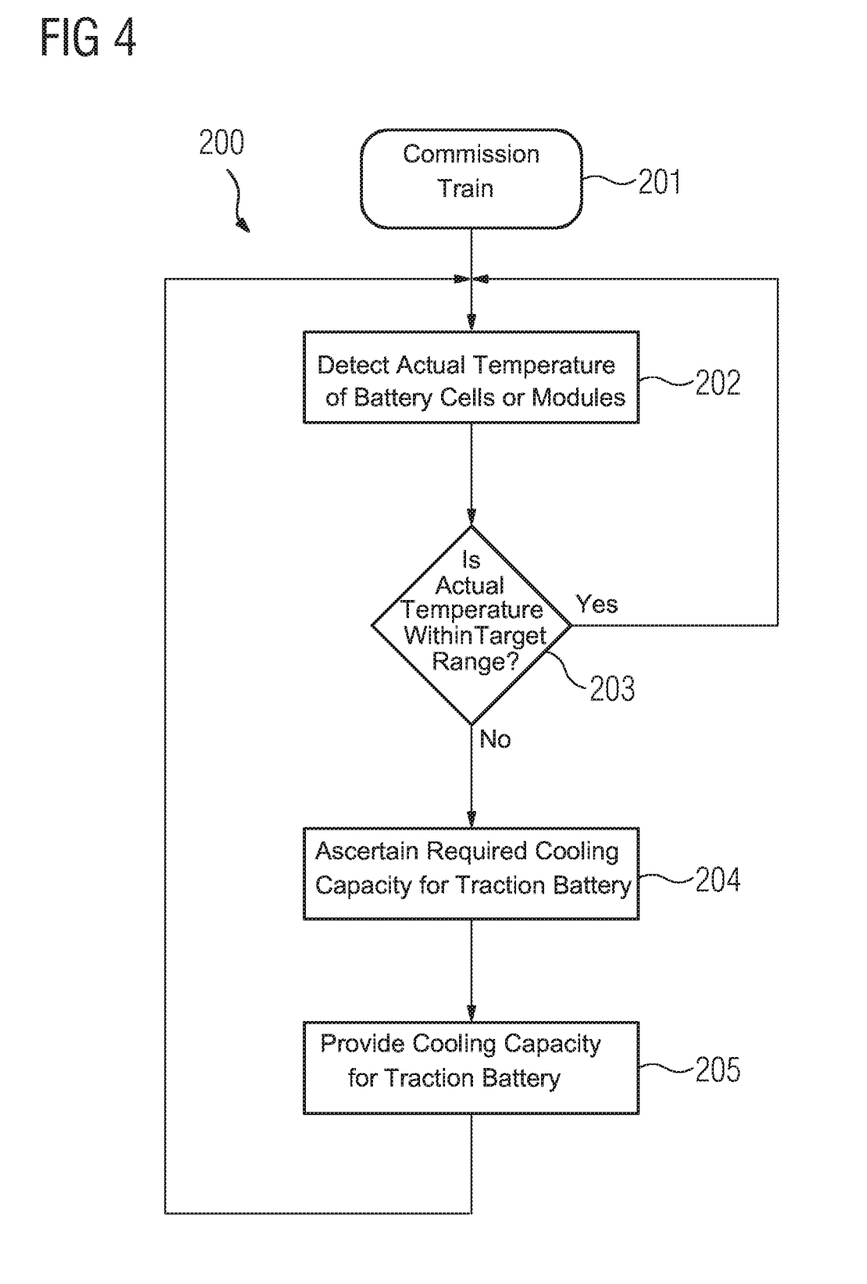

FIG. 4 shows by way of example a flow chart based on the examples in FIGS. 2 and 3 of a method 200 executed in the control device 14 with a plurality of method steps according to which the cooling of the traction battery 110 is controlled.

The method starts in step 201, for example with the commissioning of the multiple-unit train before the start of the journey as a result of which the electrical auxiliaries of the multiple-unit train, in particular the air-conditioning systems and one or more associated controls, are also commissioned. In a first method step 202, the control device detects a current actual temperature of the battery cells or cell modules of the traction battery, for example by means of the temperature sensors disclosed in FIG. 2 or the above-described alternative methods.

In a subsequent second method step 203, the control device compares the detected actual temperature with a prespecified target temperature or a prespecified target temperature range. If the actual temperature is within the target temperature range (branch "yes"), the detection of the actual temperature of the traction battery is continued. However, if the actual temperature is above the target temperature or outside the target temperature range (branch "no"), the method is continued in a subsequent third method step 204.

In the third method step 204, the control device ascertains the required cooling capacity for cooling the traction battery based on the determined difference between the detected actual temperature and the target temperature or the target temperature range. In dependence on this determined cooling capacity requirement, in a subsequent fourth method step 205, the control device actuates pumps, valves and, if necessary, further components of the air-conditioning or air-conditioning systems and the energy storage device in order to provide a cooling capacity for the traction battery in accordance with the ascertained requirement.

Herein, the described control is continued until the actual temperature again corresponds to the target temperature or is again within the target temperature range.

The depicted and above-described method steps are not comprehensive, further or modified method steps can also be executed in the control device. For example, a further step can be provided between the steps 204 and 205 in which a check is performed to determine whether at least one of the air-conditioning systems or which of the air-conditioning systems are already in operation and the cooling capacity they are currently generating. On the basis of this information, the control device can calculate whether the cooling capacity required to cool the traction battery can be provided by an air-conditioning unit that is already in operation or whether it is necessary to add a further air-conditioning system. As described above, the control device can distribute the load between the cooling of the passenger compartment and the traction battery and, where present, between the plurality of air-conditioning systems. Herein, this load distribution should have the aim of maximizing the operational efficiency of the air-conditioning system or air-conditioning systems. The first method step 201 can, for example, also include detection of an expected temperature rise in the battery cells, for example due to the onset of a charging process. This can, for example, lead to a direct transition to the third method step 204 in which the expected cooling capacity requirement is ascertained.

The invention claimed is:

1. An arrangement for cooling a traction battery of a rail-bound vehicle, the arrangement comprising:
    at least one energy storage device having at least one traction battery for supplying at least one traction device of the rail-bound vehicle with electrical energy;
    said at least one energy storage device having a cooling device for cooling said at least one traction battery, said cooling device having two coolant circuits with a circulating coolant;
    two air-conditioning devices each having a respective refrigerant circuit with a circulating refrigerant for air-conditioning a passenger compartment of a car of the rail-bound vehicle;
    each of said air-conditioning devices having a heat exchanger coupling said refrigerant circuit of a respective one of said air-conditioning devices to a respective one of said coolant circuits of said cooling device of said at least one energy storage device; and
    a control device for controlling said air-conditioning devices and said at least one energy storage device.

2. The arrangement according to claim 1, wherein said control device controls the circulation of the coolant in said coolant circuits and the circulation of the refrigerant in said refrigerant circuits.

3. The arrangement according to claim 1, wherein each of said air-conditioning devices has at least one respective valve controlled by said control device for controlling a flow of the refrigerant through said respective heat exchangers, said at least one respective valve being disposed upstream of said heat exchanger in each respective refrigerant circuit.

4. The arrangement according to claim 1, wherein each of said air-conditioning devices has a respective evaporator, and said respective heat exchangers are each connected parallel to a respective one of said evaporators in said respective refrigerant circuit.

5. A rail-bound vehicle, comprising:
    at least one arrangement according to claim 1;
    said control device being configured to control a flow of the refrigerant through said respective heat exchanger.

6. The rail-bound vehicle according to claim 5, wherein said control device is configured to control a flow of the coolant in said coolant circuits.

7. The rail-bound vehicle according to claim 6, wherein each of said air-conditioning devices has at least one valve disposed upstream of a respective heat exchanger in said refrigerant circuit, and said control device is configured to control a flow of the refrigerant through said respective heat exchanger by controlling said valve.

8. The rail-bound vehicle according to claim 5, wherein said traction battery has a plurality of battery cells or a plurality of modules with a respective plurality of battery cells.

9. The rail-bound vehicle according to claim 5, which further comprises auxiliaries of the rail-bound vehicle, said at least one energy storage device additionally supplying said auxiliaries of the rail-bound vehicle with electrical energy.

10. A method for controlling an arrangement for cooling a traction battery of an energy storage device of a rail-bound vehicle, the method comprising:
    providing the arrangement for cooling the traction battery of the rail-bound vehicle according to claim 1;
    using said control device to control a flow of the refrigerant through said heat exchangers disposed in said respective refrigerant circuits; and
    using said respective heat exchangers to couple said respective refrigerant circuits to said coolant circuits.

11. The method according to claim 10, which further comprises:
    using the control device to carry out at least the following steps:
        detecting a current or expected future temperature of said traction battery;
        comparing the detected temperature of said traction battery with a target temperature or a target temperature range;
        ascertaining a required cooling capacity for cooling said traction battery in dependence on a determined temperature difference; and
        controlling the flow of the refrigerant in said respective refrigerant circuit of said air-conditioning devices and of the coolant in said respective coolant circuits of said cooling device through said respective heat exchanger in dependence on the ascertained required cooling capacity.

12. The method according to claim 11, which further comprises using the control device to control a flow of the refrigerant through a respective evaporator of said air-conditioning devices for cooling the passenger compartment in dependence on the ascertained required cooling capacity for the traction battery.

* * * * *